(12) United States Patent
Ali et al.

(10) Patent No.: US 9,161,010 B2
(45) Date of Patent: Oct. 13, 2015

(54) SYSTEM AND METHOD FOR GENERATING ROBUST DEPTH MAPS UTILIZING A MULTI-RESOLUTION PROCEDURE

(75) Inventors: Gazi Ali, Mountain View, CA (US); Pingshan Li, Sunnyvale, CA (US); Akira Matsui, Tokyo (JP); Takami Mizukura, Tokyo (JP)

(73) Assignee: Sony Corporation, Tokyo (JP)

( * ) Notice: Subject to any disclaimer, the term of this patent is extended or adjusted under 35 U.S.C. 154(b) by 870 days.

(21) Appl. No.: 13/430,915

(22) Filed: Mar. 27, 2012

(65) Prior Publication Data

US 2013/0142415 A1     Jun. 6, 2013

(51) Int. Cl.
*H04N 13/00* (2006.01)
*H04N 13/02* (2006.01)
*G06T 5/00* (2006.01)

(52) U.S. Cl.
CPC ............ *H04N 13/0022* (2013.01); *G06T 5/003* (2013.01); *H04N 13/0271* (2013.01); *G06T 2207/10012* (2013.01); *G06T 2207/10028* (2013.01); *G06T 2207/20016* (2013.01); *H04N 2013/0081* (2013.01)

(58) Field of Classification Search
USPC ........................................................ 382/154
See application file for complete search history.

(56) References Cited

U.S. PATENT DOCUMENTS

| 2003/0235338 | A1 | 12/2003 | Dye |
| 2008/0031327 | A1 | 2/2008 | Wang et al. |
| 2009/0167923 | A1* | 7/2009 | Safaee-Rad et al. .......... 348/345 |
| 2010/0134599 | A1 | 6/2010 | Billert et al. |
| 2010/0245535 | A1 | 9/2010 | Mauchly |
| 2011/0210969 | A1 | 9/2011 | Barenbrug |

FOREIGN PATENT DOCUMENTS

| CN | 102203829 A | 9/2011 |
| EP | 2 595 116 A1 | 5/2013 |
| JP | 06 176107 A | 6/1994 |
| JP | 2001-319229 A | 11/2001 |

OTHER PUBLICATIONS

Andy Motten et al: Binary Confidence Evaluation for a Stereo Vision Based Depth Field Processor SoC, Pattern Recognition (ACPR), 2011 First Asian Conference on, IEEE, Nov. 28, 2011, pp. 456-460, XP032130049, DOI: 10.1109/ACPR.2011.6166593, ISBN: 978-1-4577-0122-1.
Yebin Liu; Xun Cao; Qionghai Dai; Wenli Xu; Continuous Depth Estimation for Multi-View Stereo, Jun. 20-25, 2009, http:/media.au.tsinghua.edu.cn/cmvs/CVPRO9-LiuYebin.pdf, http://ieeexplorejeee.org/xpl/freeabs_all.jsp?arnumber=5206712, 1-8 pgs.

* cited by examiner

*Primary Examiner* — Wesley Tucker
(74) *Attorney, Agent, or Firm* — Sony Corporation

(57) ABSTRACT

A system and method for generating robust depth maps includes a depth estimator that creates a depth map pyramid structure that includes a plurality of depth map levels that each have different resolution characteristics. In one embodiment, the depth map levels include a fine-scale depth map, a medium-scale depth map, and a coarse scale depth map. The depth estimator evaluates depth values from the fine-scale depth map by utilizing fine-scale confidence features, and evaluates depth values from the medium-scale depth map and the coarse-scale depth map by utilizing coarse-scale confidence features. The depth estimator then fuses optimal depth values from the different depth map levels into an optimal depth map.

20 Claims, 15 Drawing Sheets

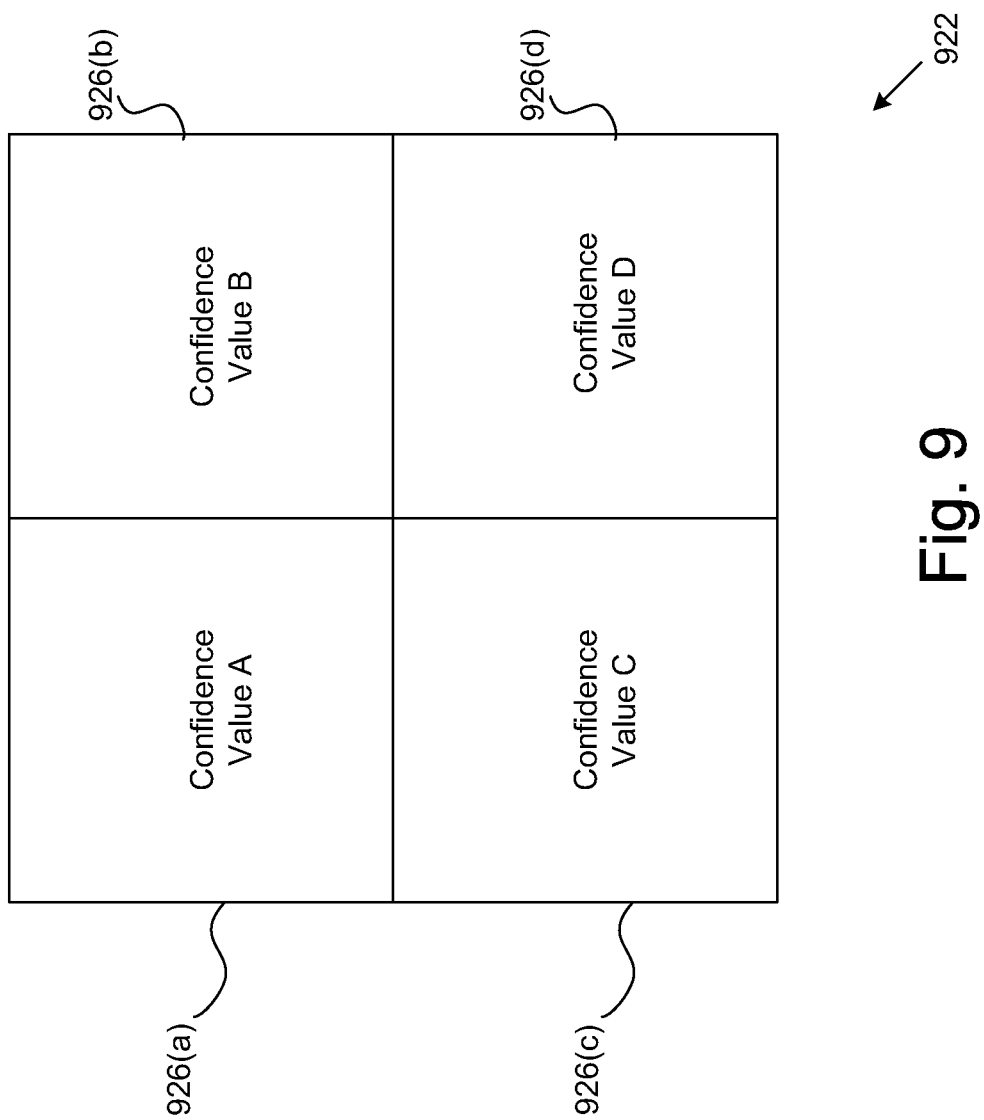

SYSTEM AND METHOD FOR GENERATING ROBUST DEPTH MAPS UTILIZING A MULTI-RESOLUTION PROCEDURE

CROSS-REFERENCE TO RELATED APPLICATIONS

This Application is related to, and claims priority in, U.S. Provisional Patent Application No. 61/565,839, entitled "Method And Apparatus To Generate Robust Depth Map Using Multi-Resolution Approach," filed on Dec. 1, 2011. The foregoing related Application is commonly assigned, and is hereby incorporated by reference.

BACKGROUND SECTION

1. Field of the Invention

This invention relates generally to techniques for analyzing image data, and relates more particularly to a system and method for utilizing scene detection in a depth estimation procedure.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method for generating robust depth maps utilizing a multi-resolution procedure is disclosed. In one embodiment, a depth estimator initially generates a level 2 depth map by utilizing any effective techniques. For example, the level 2 depth map may be implemented with a compression ratio that produces a relatively fine-scale resolution. The depth estimator calculates robust confidence values corresponding to the respective depth values from the level 2 depth map by utilizing any effective techniques. The depth estimator then categorizes the depth values according to their respective confidence values into high-confidence depth values, medium-confidence depth values, and low-confidence depth values.

The depth estimator also generates a level 1 depth map and a level 0 depth map by utilizing any effective techniques. For example, the level 1 depth map may be implemented with a compression ratio that produces a medium-scale resolution, and the level 0 depth map may be implemented with a compression ratio that produces a relatively coarse-scale resolution. The depth estimator calculates robust confidence values corresponding to the respective depth values from the level 1 depth map and level 0 depth map by utilizing any effective techniques. The depth estimator then utilizes the calculated confidence values to identify any reliable depth value candidates from the level 0 depth map and the level 1 depth map according to predetermined reliability criteria.

The depth estimator next performs a resizing procedure upon the blocks from the level 1 depth map and the level 0 depth map to match the block size of the level 2 depth map by utilizing any effective techniques. The depth estimator also performs a magnitude scaling procedure to scale the depth values from the level 1 depth map and the level 0 depth map to match the depth value range of the level 2 depth map by utilizing any effective techniques.

The depth estimator then determines whether any additional reliable depth value candidates have been identified from level 1 depth map or level 0 depth map. The depth estimator marks any unreliable depth values as outliers that are unsuitable for populating the final optimized depth map. The depth estimator also utilizes any reliable depth value candidates to update the optimal depth values for the final optimized depth map according to any effective techniques. For example, a depth value with the optimum confidence measure may be selected, or a weighted or unweighted averaging method may be utilized to combine several different reliable depth values.

The depth estimator advantageously fuses the optimal depth values from the different level depth maps to generate the final optimized depth map. Finally, the depth estimator may create a confidence map based upon the confidence values corresponding to the optimal depth values of the final optimized depth map. The process may then terminate. The present invention therefore provides an improved system and method for generating a depth map utilizing a multi-resolution procedure.

BRIEF DESCRIPTION OF THE DRAWINGS

FIG. 9 is a diagram of a simplified confidence map, in accordance with one embodiment of the present invention.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for generating robust depth maps, and includes a depth estimator that creates a depth map pyramid structure that includes a plurality of depth map levels that each have different resolution characteristics. In one embodiment, the depth map levels include a fine-scale depth map, a medium-scale depth map, and a coarse scale depth map. The depth estimator evaluates depth values from the fine-scale depth map by utilizing fine-scale confidence features, and evaluates depth values from the medium-scale depth map and the coarse-scale depth map by utilizing coarse-scale confidence features. The depth estimator then fuses optimal depth values from the different depth map levels into an optimal depth map.

Figure 1:
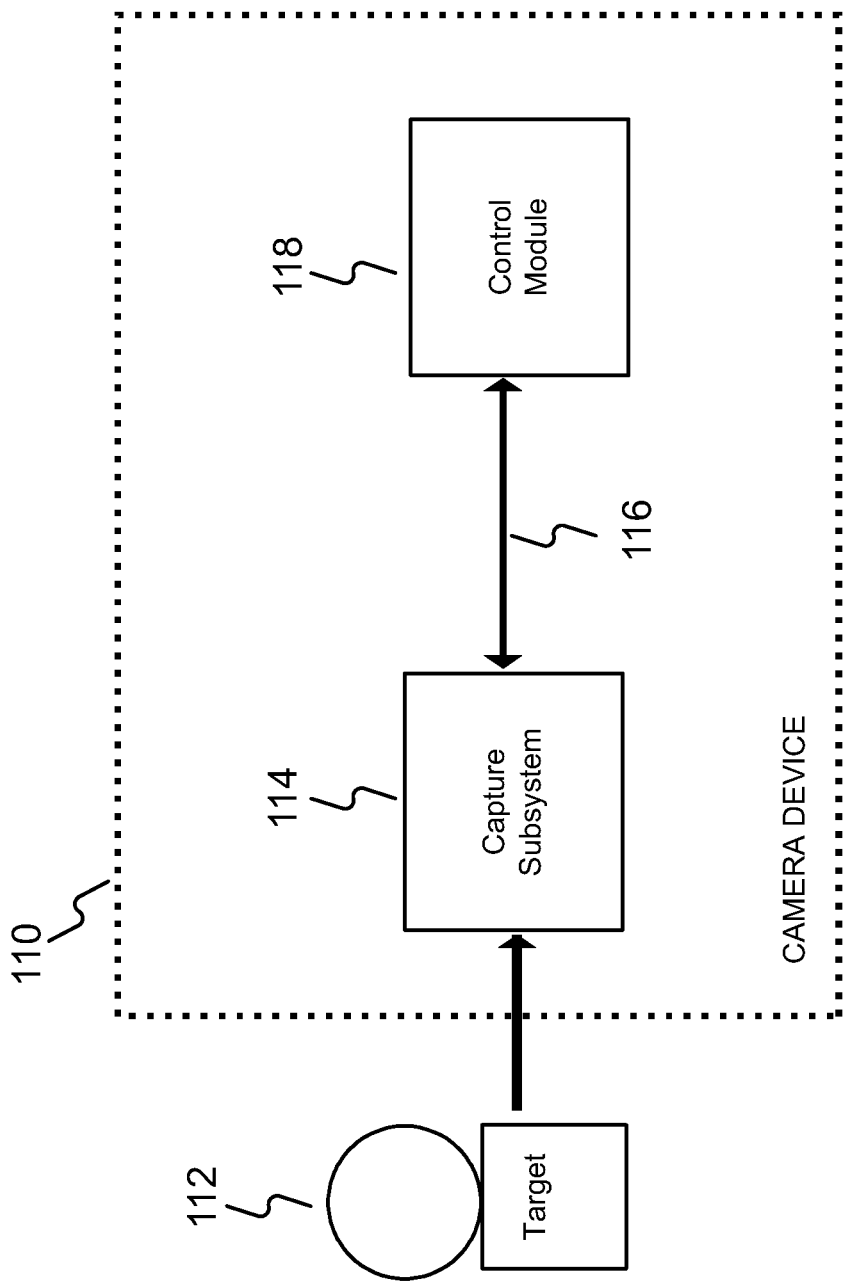
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
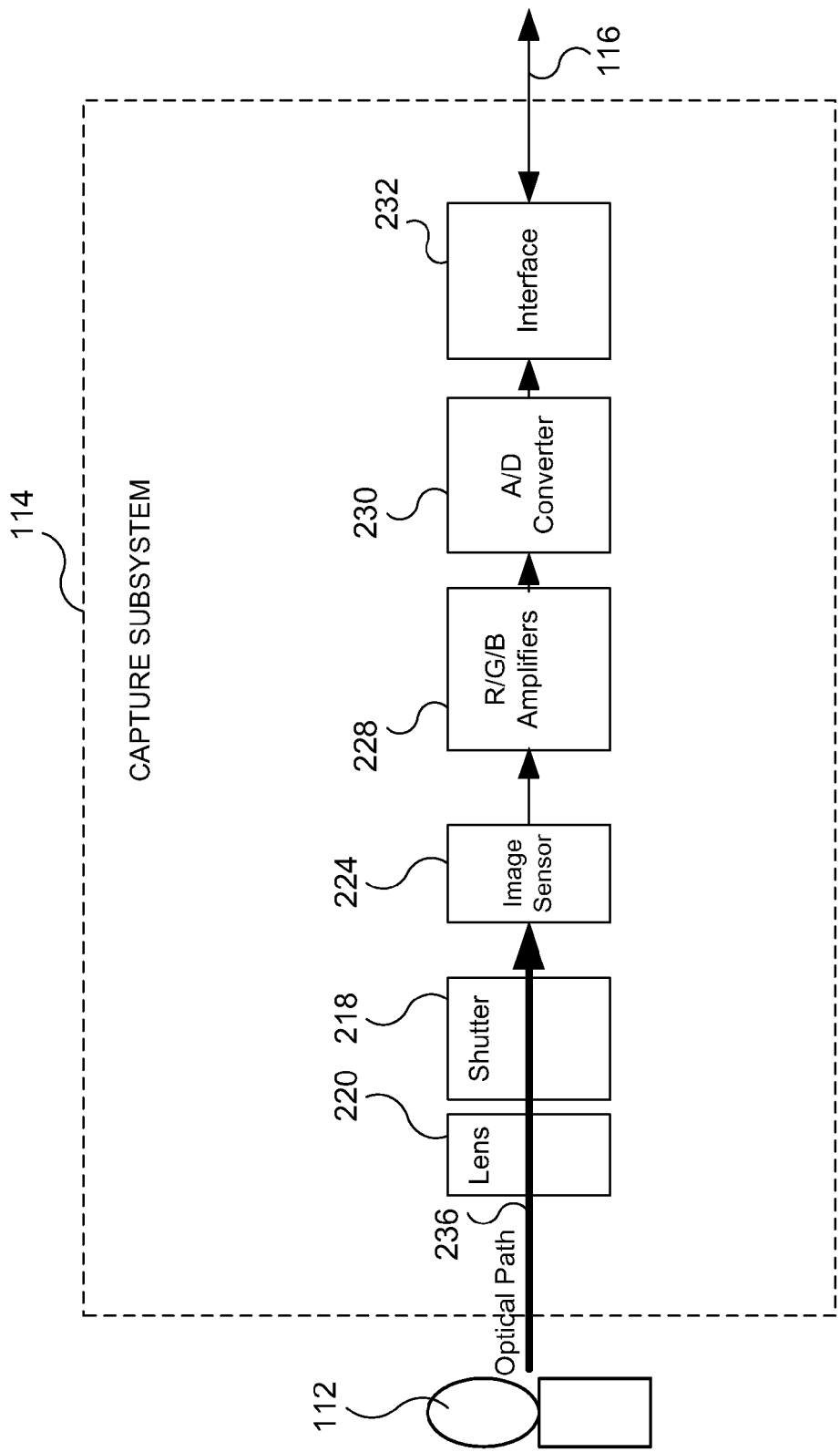
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. Image sensor 224, which may preferably include a charged-coupled device (CCD), may responsively generate a set of image data representing the target 112. The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-9.

Figure 3:
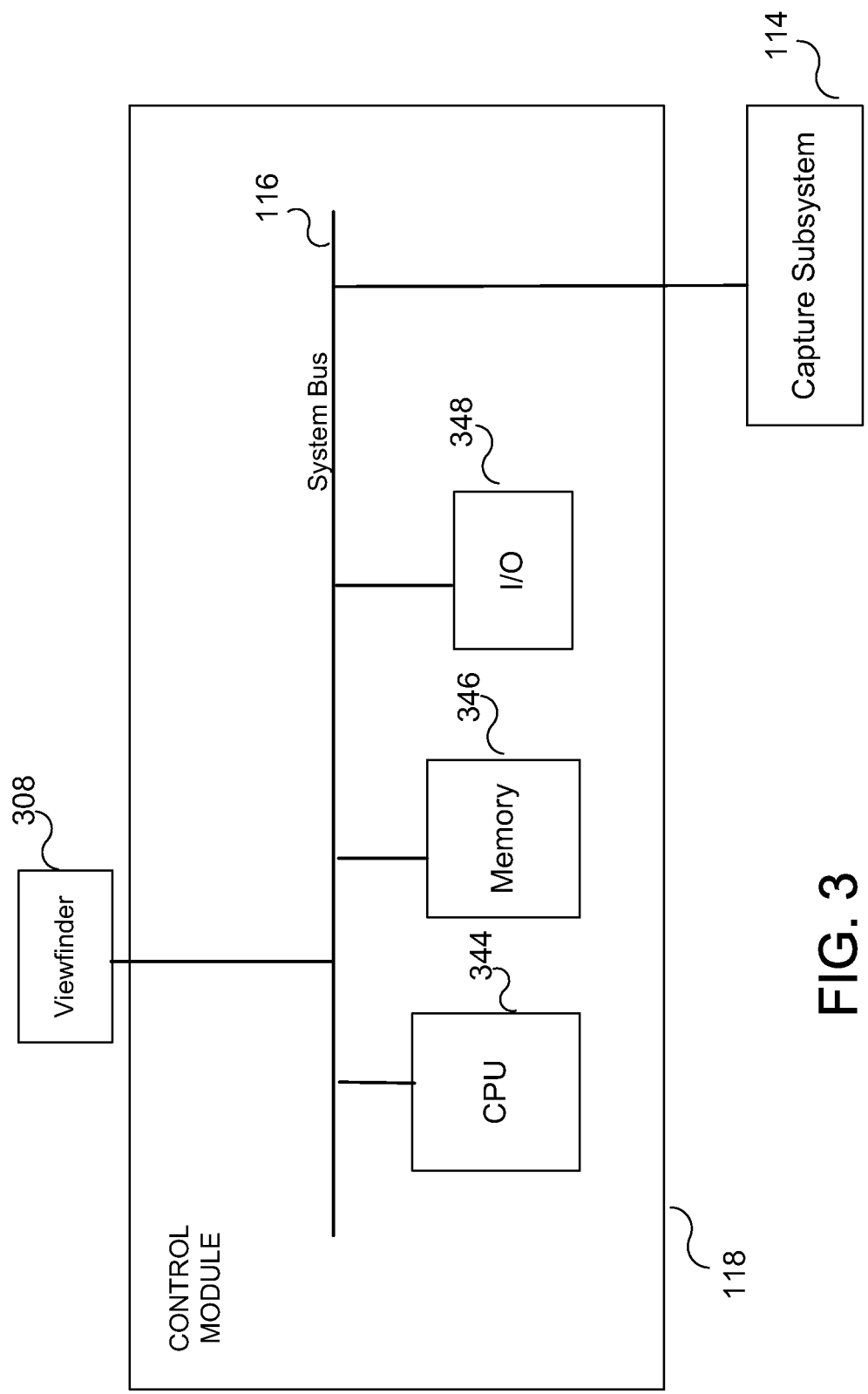
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 9.

Figure 4:
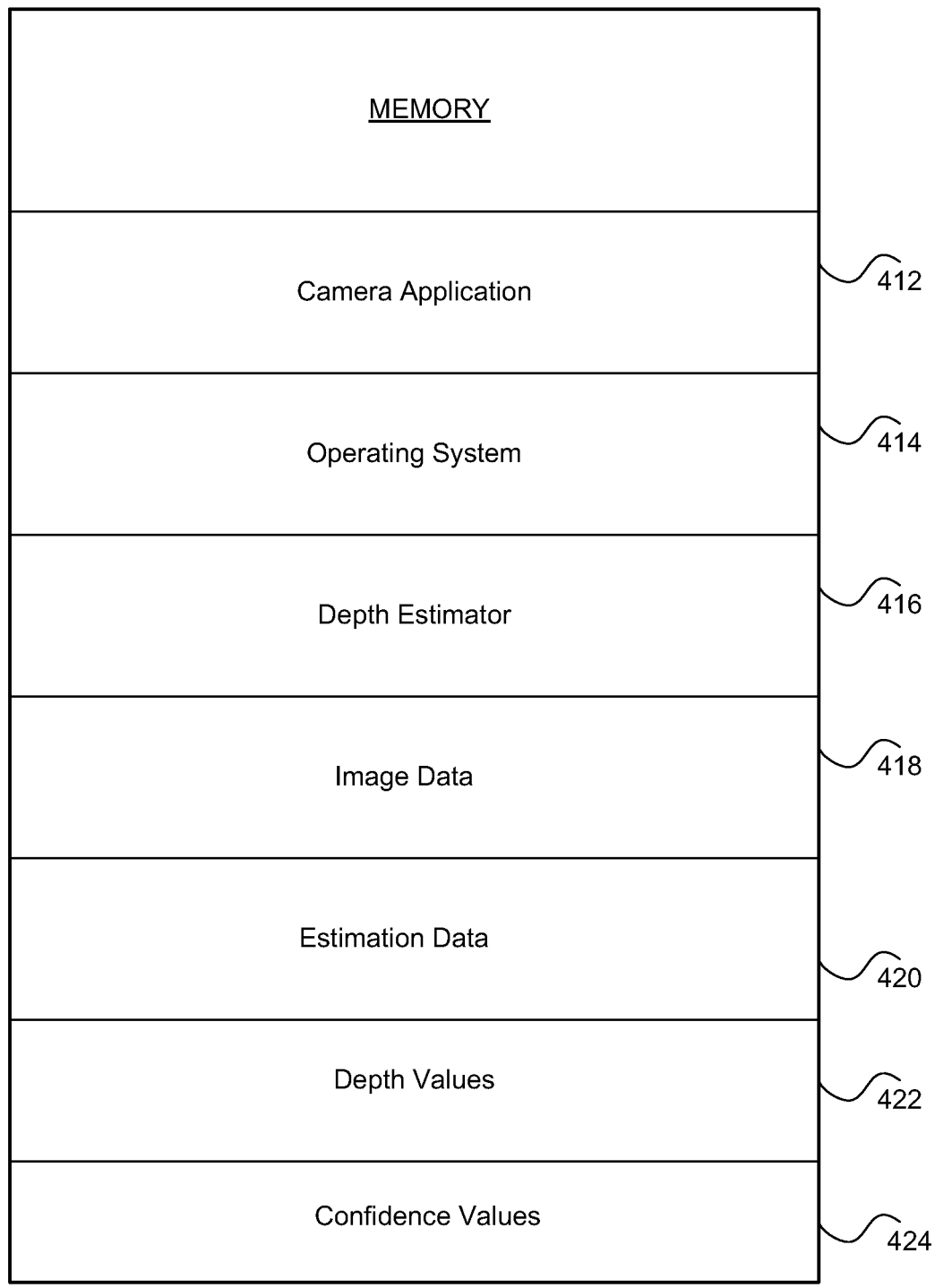
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, depth values 422, and confidence values 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure for generating depth maps in camera 110. In the FIG. 4 embodiment, image data 418 may include one or more images of a photographic target 112 captured by camera device 110. Estimation data 420 may include any types of information or data for performing a depth map generation procedure.

In the FIG. 4 embodiment, depth values 422 may represent distances between camera 110 and various portions of a photographic target or scene. The depth values 422 may be utilized to populate a depth map, as discussed below in conjunction with FIG. 5A. Confidence values 424 represent relative likelihoods that respective depth values 422 are correct. Additional details regarding the operation of depth estimator 416 are further discussed below in conjunction with FIGS. 5-9.

Figure 5A:
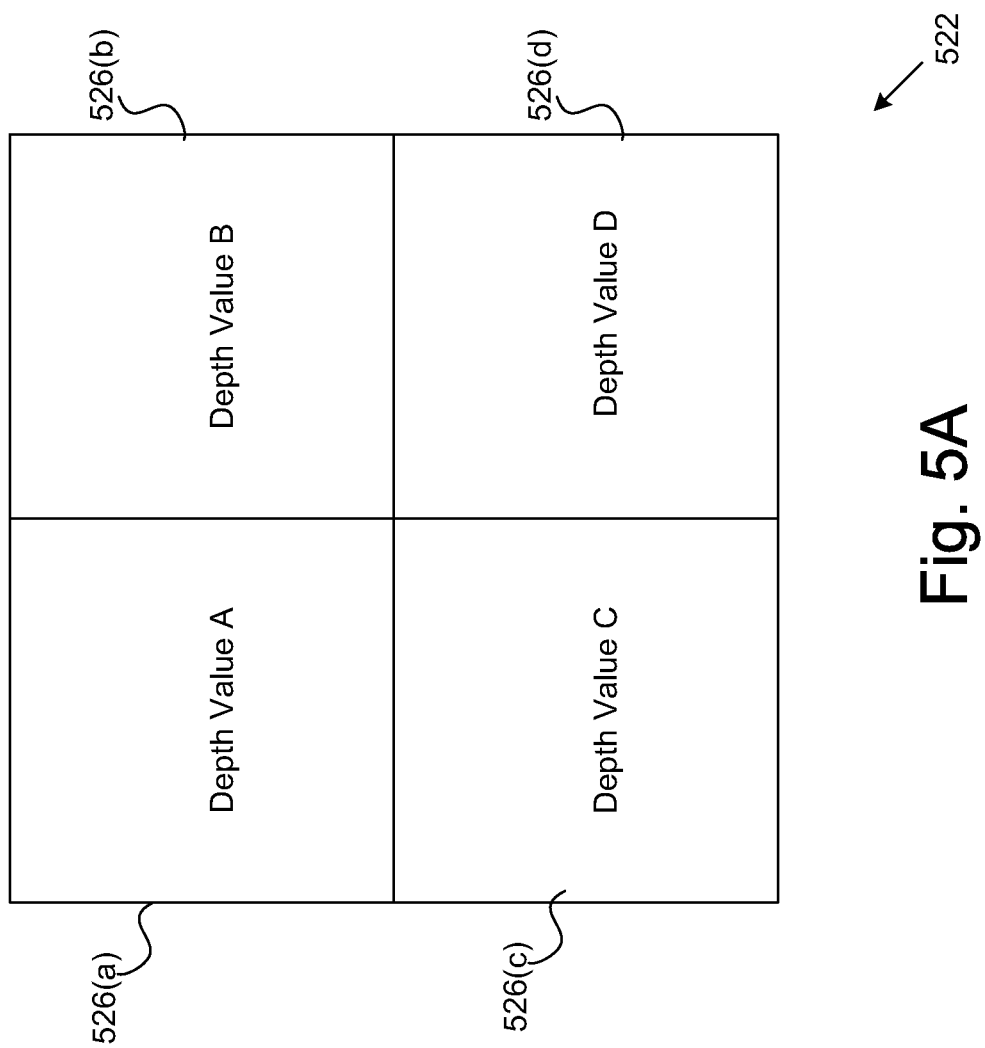
FIG. 5A is a diagram for one embodiment of a simplified depth map, in accordance with the present invention.

Referring now to FIG. 5A, a diagram for one embodiment of a simplified depth map 522 is shown, in accordance with the present invention. The FIG. 5A depth map 522 is presented for purposes of illustration, and in alternate embodiments, depth maps may include various other components and configurations in addition to, or instead of, those components and configurations discussed in conjunction with the FIG. 5A embodiment. For example, for purposes of simplicity, the FIG. 5A depth map 522 is shown with only four depth values. However, depth maps with any number of depth values are equally contemplated in the present invention.

In the FIG. 5A embodiment, depth map 522 corresponds to a particular set of image data in which the individual depth values represent distances between camera 110 (FIG. 1) and various portions of the photographic target or scene. In certain embodiments, initial depth values for an initial depth map may be determined directly from raw image data in any effective manner. In the FIG. 5A example, depth map 522 includes a depth value A 526(*a*), a depth value B 526(*b*), a depth value C 526(*c*), and a depth value D 526(*d*). Additional details regarding the generation of depth maps are further discussed below in conjunction with FIGS. 6-9.

Figure 5B:
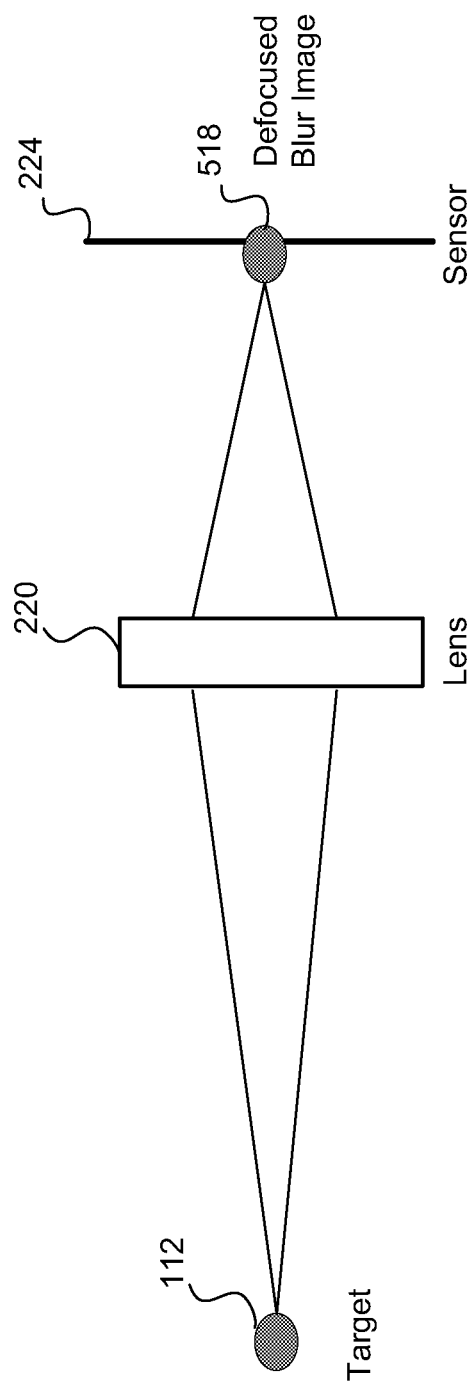
FIG. 5B is a diagram of one exemplary embodiment for capturing a defocused blur image.

Referring now to FIG. 5B, a diagram of one exemplary embodiment for capturing a defocused blur image 518 is shown, in accordance with the present invention. The FIG. 5B embodiment is provided for purposes of illustration, and in alternate embodiments, the present invention may utilize various other configurations and elements to capture defocused blur images 518.

In the FIG. 5B embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are, for example, one depth-of-field away from each other. A slope of a known matching curve and the blur difference can be utilized to determine the depth of a given target 112.

Figure 5C:
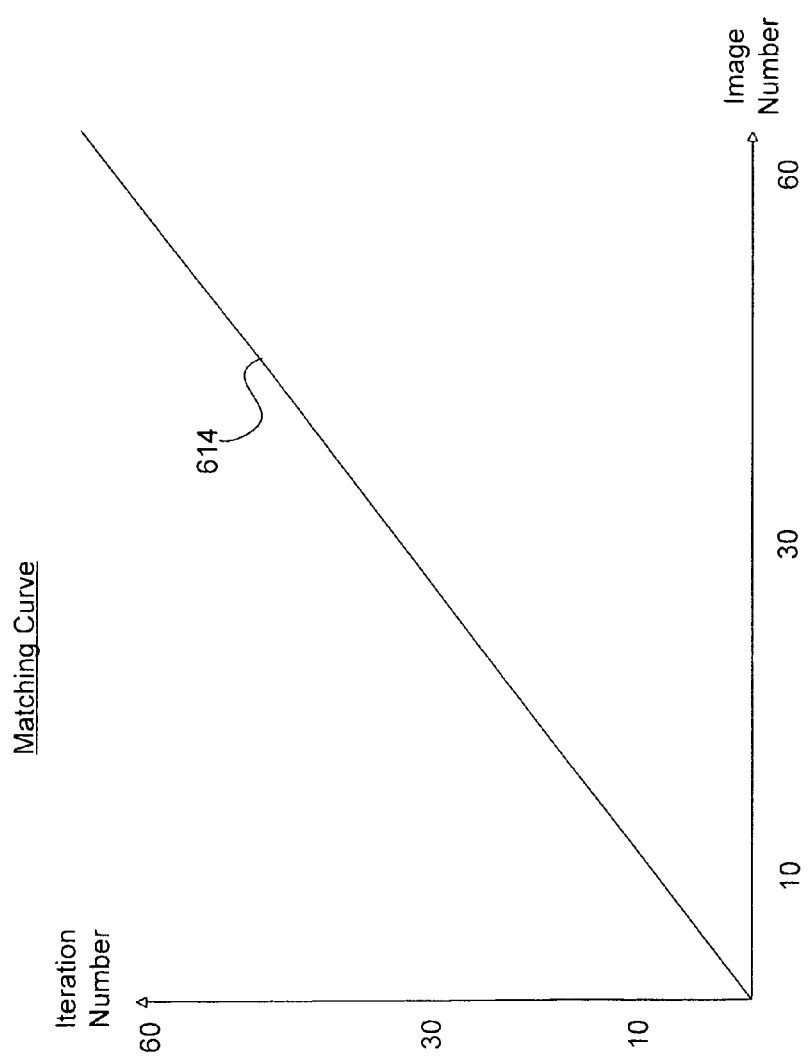
FIG. 5C is a graph of one embodiment of an exemplary matching curve.

Referring now to FIG. 5C, a graph of an exemplary matching curve 714 is shown, in accordance with one embodiment of the present invention. The FIG. 5C embodiment is presented for purposes of illustration, and in alternate embodiments, the present invention may be implemented to utilize matching curves with configurations and parameters in addition to, or instead of, certain of those configurations and parameters discussed in conjunction with the FIG. 5C embodiment.

In certain embodiments, a blur image 1 and a more-defocused blur image 2 may be captured, the sharper image 1 may be convolved with a Gaussian kernel (for example, a 3×3 Gaussian matrix with small variance) to produce a convolved image 1. The convolved image 1 is compared to blur image 2. This process is repeated until the two blur image match. The number of iterations may then be graphed against depth-of-field (or image numbers in increments of one DOF) to produce a blur matching curve that can be used to estimate the distance from any out-of-focus position to the in-focus position. Additional details regarding the foregoing depth estimation technique are further discussed in U.S. Pat. No. 8,045,046 to Li et al., which is hereby incorporated by reference.

Figure 6:
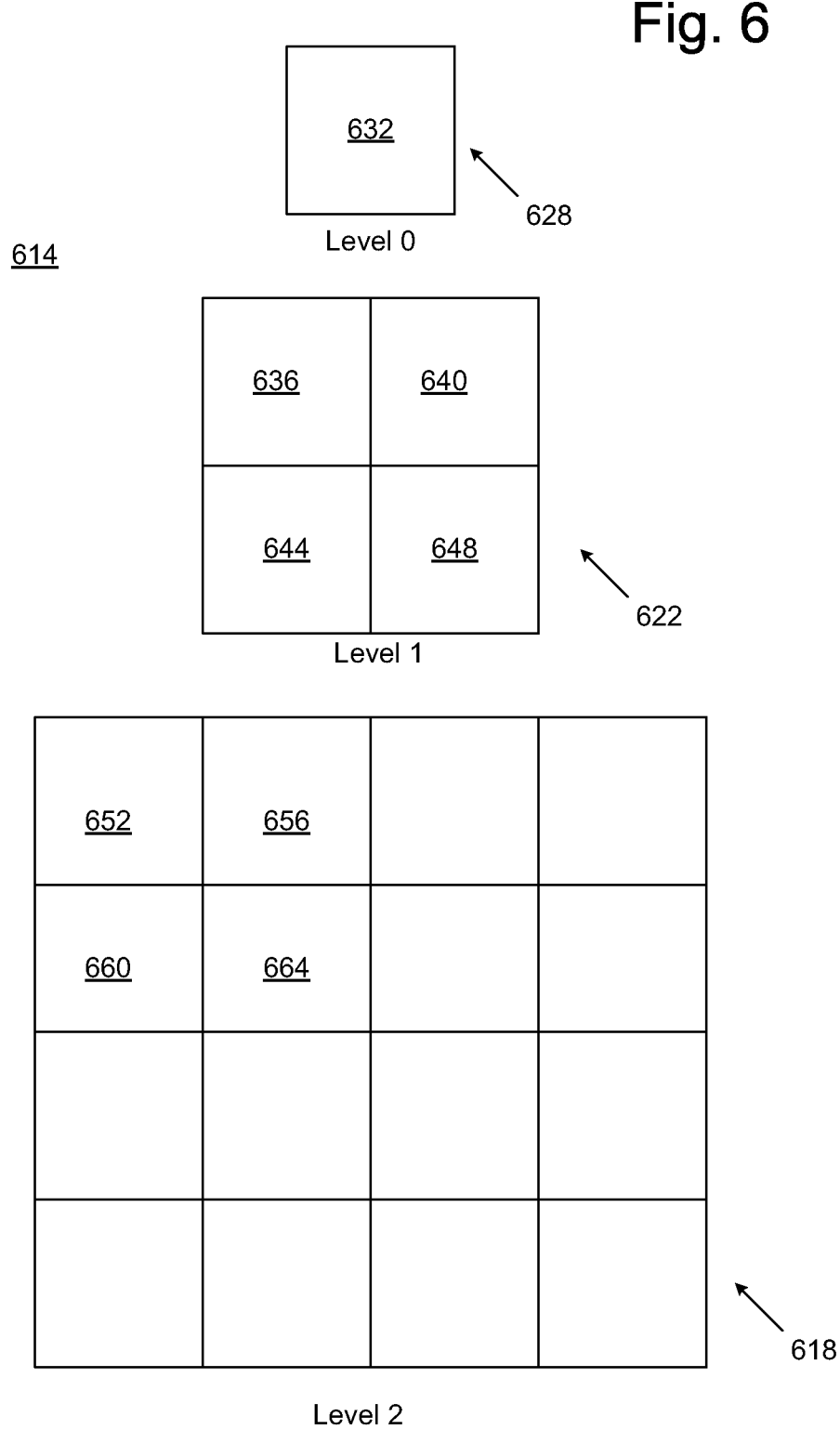
FIG. 6 is a diagram of a multi-resolution pyramid structure, in accordance with one embodiment of the present invention.

Referring now to FIG. 6, a diagram of a multi-resolution pyramid structure 614 is shown, in accordance with one embodiment of the present invention. The FIG. 6 pyramid 614 is presented for purposes of illustration, and in alternate embodiments, multi-resolution pyramids 614 may include various other components and configurations in addition to, or instead of, those components and configurations discussed in conjunction with the FIG. 6 embodiment.

In the FIG. 6 embodiment, multi-resolution pyramid 614 includes a level 2 depth map 618, a level 1 depth map 622, and a level 0 depth map 628 that each have a different resolution level. In other embodiments, any other effective number or configuration of resolution levels may be similarly utilized. In the FIG. 6 embodiment, all resolution levels 618, 622, and 628 are compressed from the same set of image data, but each level has a different compression ratio. For example, in certain embodiments, level 0 may have a compression ratio of 1/16, level 1 may have a compression ratio of 1/8, and level 2 may have a compression ratio of 1/4. The compression ratios may be achieved in any effective manner. For example, a sub-sampling compression technique may be utilized.

In the FIG. 6 embodiment, each level 618, 622, and 628 includes one or more blocks. For example, level 0 has a single block 632, level 1 has four blocks arranged in a 2×2 matrix, and level 2 has sixteen blocks arranged in a 4×4 matrix. Each block may represent a predefined number of pixels. For example, in certain embodiments, each block may represent 16×16 depth values. Due to the different compression ratios, the three different levels 628, 622, and 618 each represent the same area from the original image, data. For example, the single block 632 of level 0 corresponding to blocks 636, 640, 644, and 648 of level 1. Similarly, each block of level 1 corresponds to four blocks from level 2. For example, block 636 of level 1 corresponds to blocks 652, 656, 660, and 664 from level 2.

In the FIG. 6 embodiment, each block of all three levels has an associated depth value. Therefore, level 0 has one depth value, level 1 has four depth values, and level 2 has sixteen depth values. In certain alternate embodiments, the three levels may be implemented to include depth values/blocks that differ in quantity from the particular configuration shown in the FIG. 6 embodiment. The present invention advantageously evaluates these various depth values with robust confidence measure techniques, and then fuses the optimal depth values to generate a final depth map. Additional details regarding the utilization of multi-resolution pyramids are further discussed below in conjunction with FIGS. 7-9.

Figure 7A:
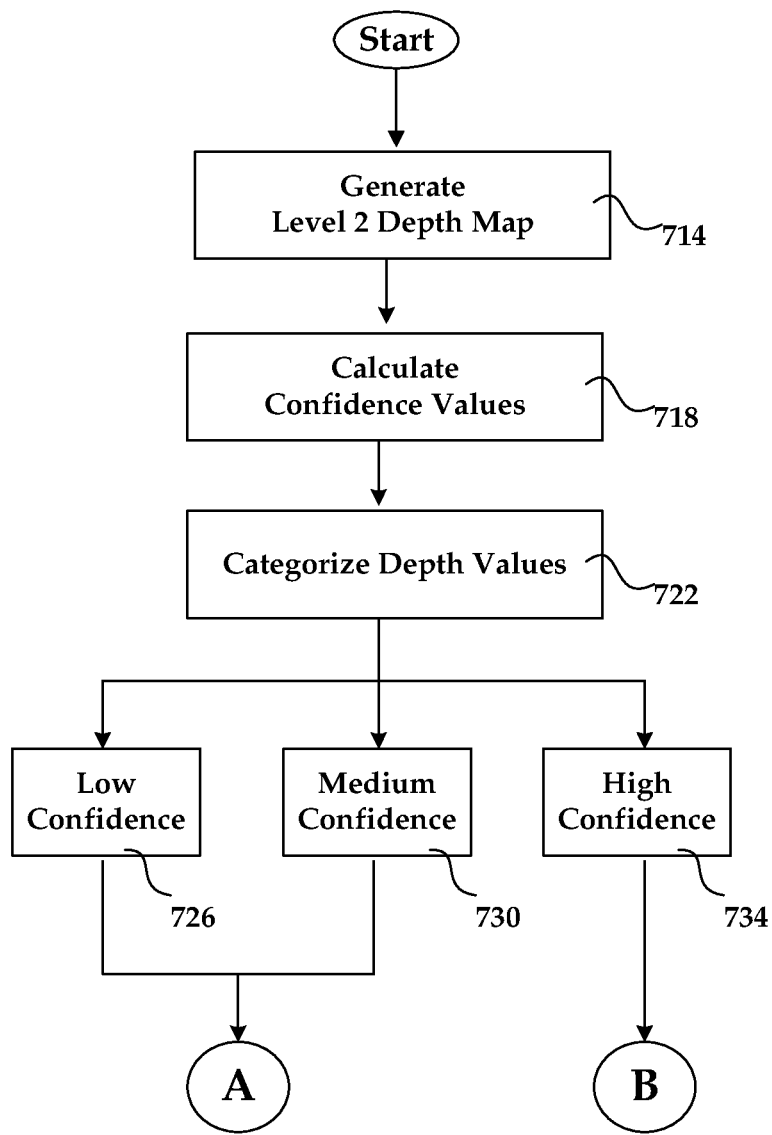
FIGS. 7A-7C are a flowchart of method steps for generating a depth map utilizing a multi-resolution procedure, in accordance with one embodiment of the present invention.
Figure 7B:
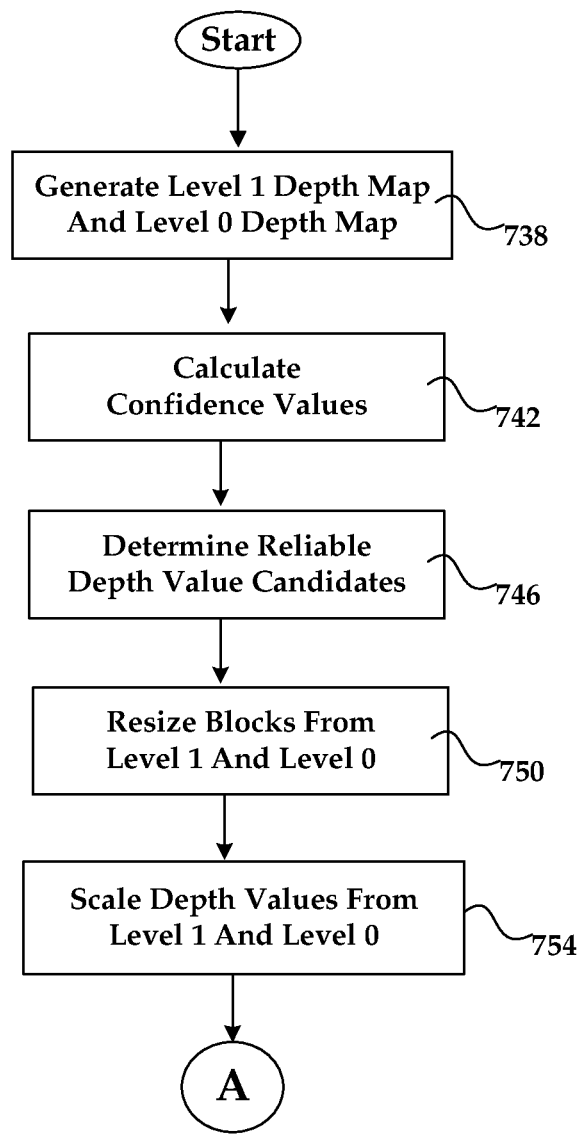
Figure 7C:
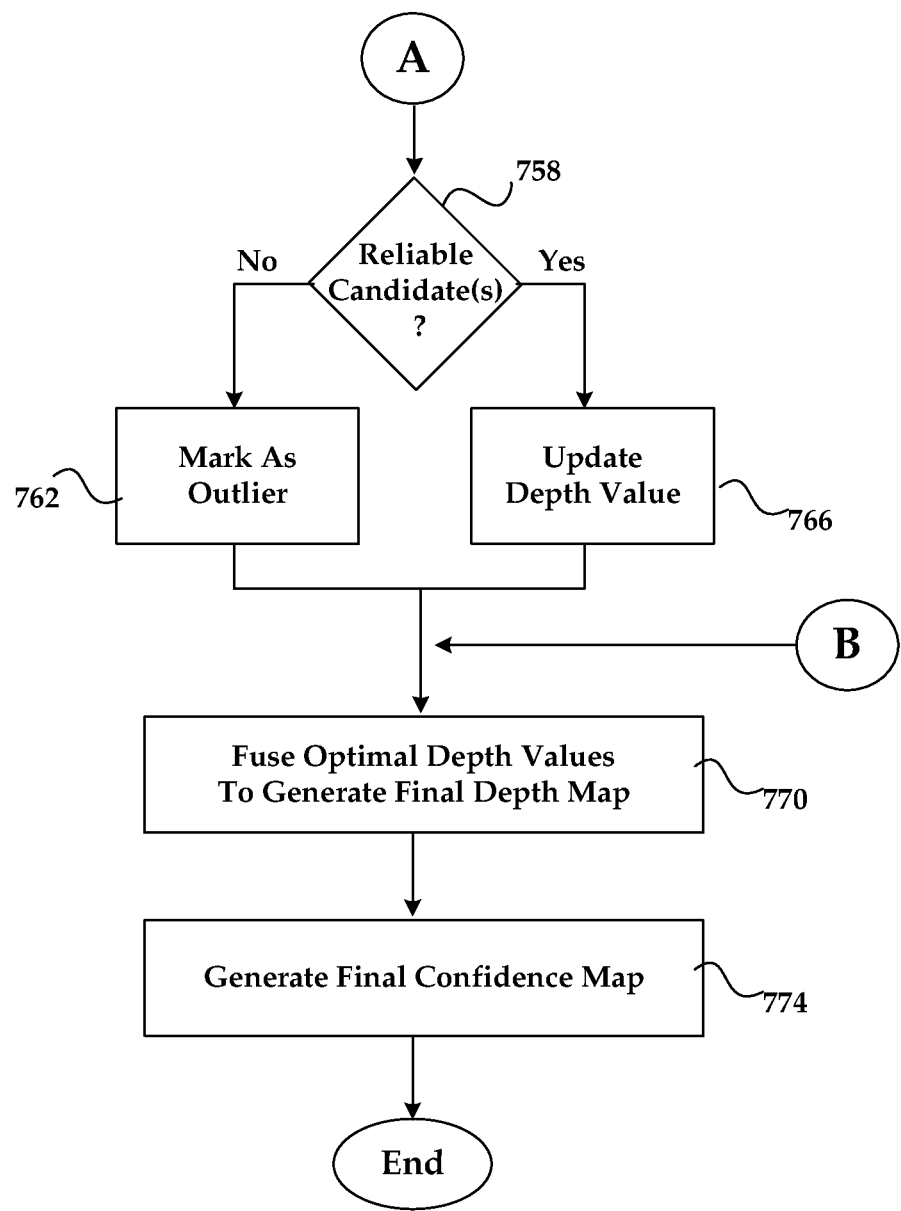

Referring now to FIGS. 7A-7C, a flowchart of method steps for generating a depth map utilizing a multi-resolution procedure is shown, in accordance with one embodiment of the present invention. The FIG. 7 embodiment is presented for purposes of illustration, and in alternate embodiments, the present invention may readily utilize various steps and sequences other than those steps and sequences discussed in conjunction with the FIG. 7 embodiment.

In the FIG. 7A embodiment, in step 714, a depth estimator 416 (FIG. 4) or other appropriate entity generates a level 2 depth map 618 by utilizing any effective techniques. For example, the level 2 depth map 618 may be implemented with a compression ratio that produces a relatively fine-scale resolution. In step 718, depth estimator 416 may then calculate robust confidence values corresponding to the respective depth values from the level 2 depth map 618 by utilizing any effective techniques. In step 722, depth estimator 416 categorizes the depth values according to their respective confidence values into high-confidence depth values 734, medium-confidence depth values 730, and low-confidence depth values 726. The FIG. 7A process then advances to FIG. 7C through connecting letters "A" and "B."

In the FIG. 7B embodiment, in step 738, the depth estimator 416 or other appropriate entity generates a level 1 depth map 622 and a level 0 depth map 628 by utilizing any effective techniques. For example, the level 1 depth map 622 may be implemented with a compression ratio that produces a medium-scale resolution, and the level 0 depth map 628 may be implemented with a compression ratio that produces a relatively coarse-scale resolution.

In step 742, depth estimator 416 may then calculate robust confidence values corresponding to the respective depth values from the level 1 depth map 622 and level 0 depth map 628 by utilizing any effective techniques. In step 750, depth estimator 416 utilizes the calculated confidence values to identify any reliable depth value candidates from level 0 depth map 626 and level 1 depth map 622 according to predetermined reliability criteria.

In step 750, depth estimator 416 performs a resizing procedure upon the blocks from level 1 depth map 622 and level 0 depth map 628 to match the block size of level 2 depth map 618 by utilizing any effective techniques. For example, various spatial interpolation techniques such as bicubic or spline methods may be utilized. In certain embodiments, an edge-preserving interpolation algorithm may be utilized to perform resizing in which a mask-based 2× interpolation kernel is used in conjunction with a filter matrix. One example of formulas for the edge-preserving algorithm is show below.

$$h = \frac{1}{4} \begin{bmatrix} 1 & 2 & 1 \\ 2 & 4 & 2 \\ 1 & 2 & 1 \end{bmatrix} \times \begin{bmatrix} m_{11} & m_{12} & m_{13} \\ m_{21} & m_{22} & m_{23} \\ m_{31} & m_{32} & m_{33} \end{bmatrix}$$

$$m_{i,j} = \begin{cases} 1; & \text{if } |m_{i,j}| < \text{threshold} \\ 0; & \text{else} \end{cases}$$

In step 754, depth estimator 416 performs a magnitude scaling procedure to scale the depth values from level 1 depth map 622 and level 0 depth map 628 to match the depth value range of level 2 depth map 618 by utilizing any effective techniques. For example, the scaling procedure may utilize a theoretical approach or a data-driven approach. The FIG. 7B process may then advance to step 758 of FIG. 7C through connecting letter "A."

In step 758, depth estimator 416 determines whether any additional reliable depth value candidates have been identified from level 1 depth map 622 or level 0 depth map 628. In step 762, depth estimator 416 marks any unreliable depth values as outliers that are unsuitable for populating the final optimized depth map. In step 766, depth estimator 416 utilizes any reliable depth value candidates to update the optimal depth values for the final optimized depth map according to any effective techniques. For example, a depth value with the optimum confidence measure may be selected, or a weighted or unweighted averaging method may be utilized to combine several different reliable depth values. The depth estimator 416 may also update a confidence map of confidence values at this point.

In step 770, depth estimator 416 advantageously fuses the optimal depth values from the different level depth maps 618, 622, and 628 to generate the final optimized depth map. Finally, in step 774, depth estimator 416 may create a confidence map based upon the confidence values corresponding to the optimal depth values of the final optimized depth map. The FIG. 7 process may then terminate. The present invention therefore provides an improved system and method for generating a depth map utilizing a multi-resolution procedure.

Figure 8A:
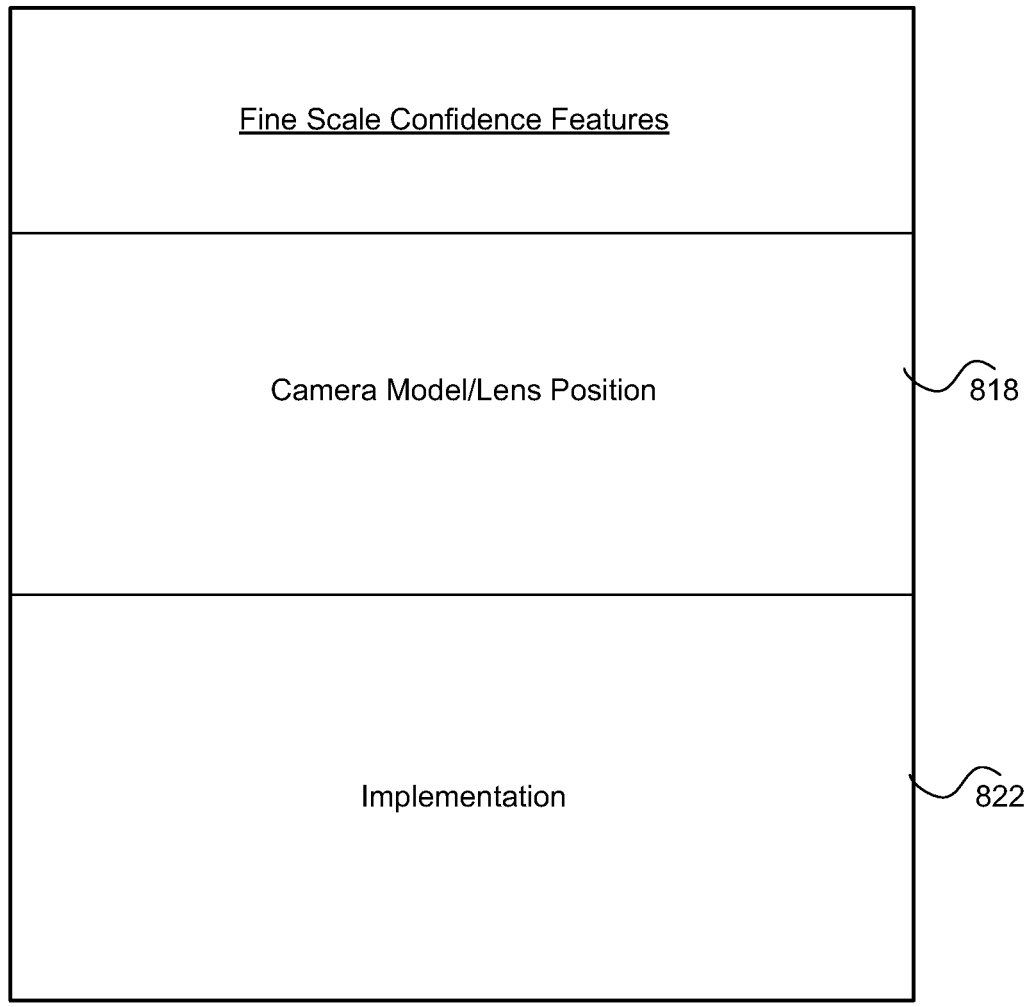
FIG. 8A is a diagram of fine scale confidence features, in accordance with one embodiment of the present invention.

Referring now to FIG. 8A, a diagram of fine scale confidence features is shown, in accordance with one embodiment of the present invention. The FIG. 8A embodiment is presented for purposes of illustration, and in alternate embodiments, the present invention may utilize confidence features other than those discussed in conjunction with the FIG. 8A embodiment.

In the FIG. 8A embodiment, confidence features 812 include camera model/lens position features 818 that may include any operational characteristics or limitations of a particular camera 110 (FIG. 1). For example, camera model/lens position features 818 may include, but are not limited to, optical characteristics, lens position, zoom position, camera calibration, etc. In one embodiment, camera model/lens position features 818 may include a zoom range that is supported by a given camera 110.

In the FIG. 8A embodiment, confidence features 812 further include implementation features 822 that may include any parameters or characteristics of a particular algorithm that is used to generate a depth map. For example, implementation features 822 may include, but are not limited to, block size utilized and matching kernel utilized. In the FIG. 8A embodiment, depth estimator 416 may selectively combine confidence features 812 in a weighted or unweighted manner to generate confidence values that represent the likelihood that corresponding depth values are accurate for fine-scale depth maps such as level 2 depth map 618 (FIG. 6).

Figure 8B:
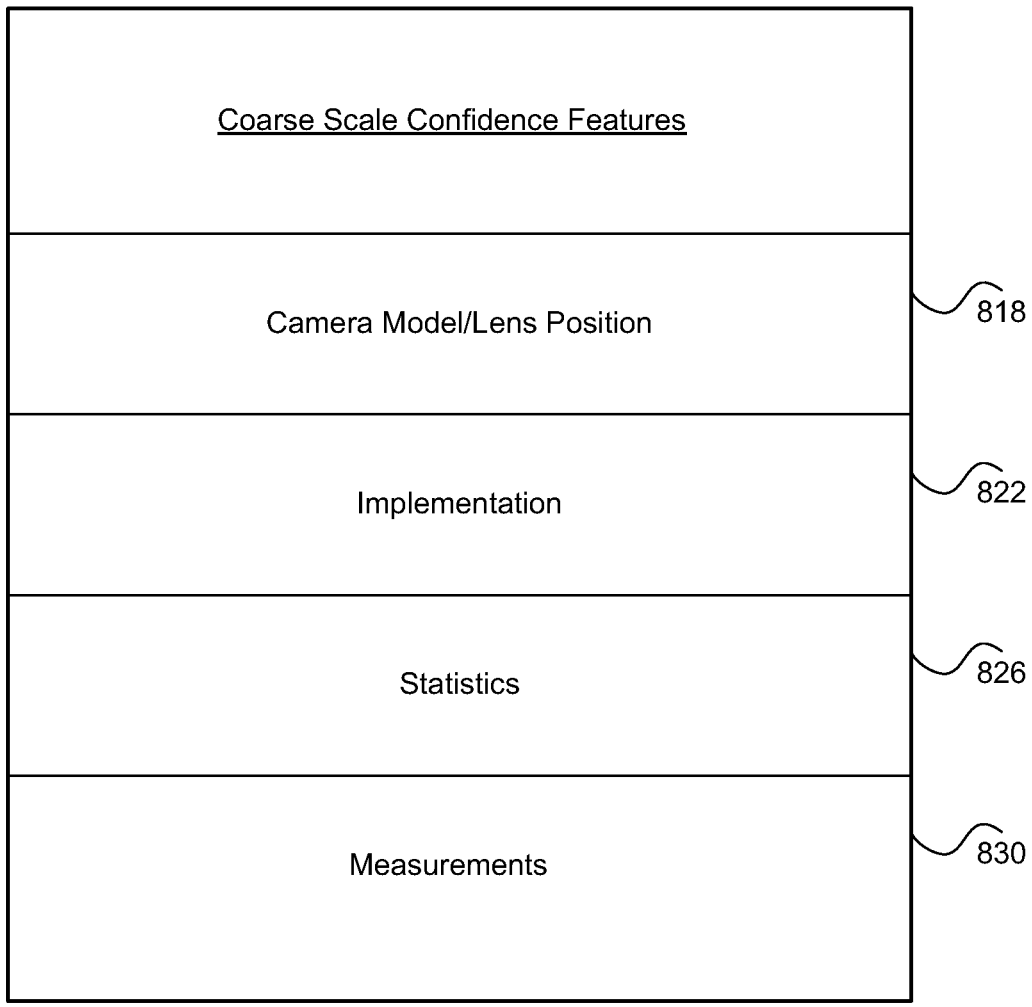
FIG. 8B is a diagram of coarse scale confidence features, in accordance with one embodiment of the present invention.

Referring now to FIG. 8B, a diagram of coarse scale confidence features 814 is shown, in accordance with one embodiment of the present invention. The FIG. 8B embodiment is presented for purposes of illustration, and in alternate embodiments, the present invention may utilize confidence features other than those discussed in conjunction with the FIG. 8B embodiment.

The FIG. 8B embodiment, coarse-scale confidence features 814 include camera model/lens position features 818 and implementation features 822 that are similar to those identically-named features discussed above in conjunction with FIG. 8A. In addition, coarse-scale confidence features 814 may include statistic features 826 and measurements features 830. In the FIG. 8B embodiment, measurements features 830 may include any features that are based upon appropriate measurement data. For example, measurements features 830 may include, but are not limited to, motion vector measurements and pixel intensity measurements.

In the FIG. 8B embodiment, statistics features 826 may include any effective features derived from appropriate statistical analysis procedures. For example, statistics features 826 may include, but are not limited to, optimization rate statistics or a Sum of Absolute Differences (SAD) convergence technique that is further discussed below in conjunction with FIG. 8C. In the FIG. 8B embodiment, depth estimator 416 may selectively combine confidence features 814 in a weighted or unweighted manner to generate confidence values that represent the likelihood that corresponding depth values are accurate for relatively coarse-scale depth maps such as level 0 depth map 626 and level 1 depth map 622 (see FIG. 6).

Figure 8C:
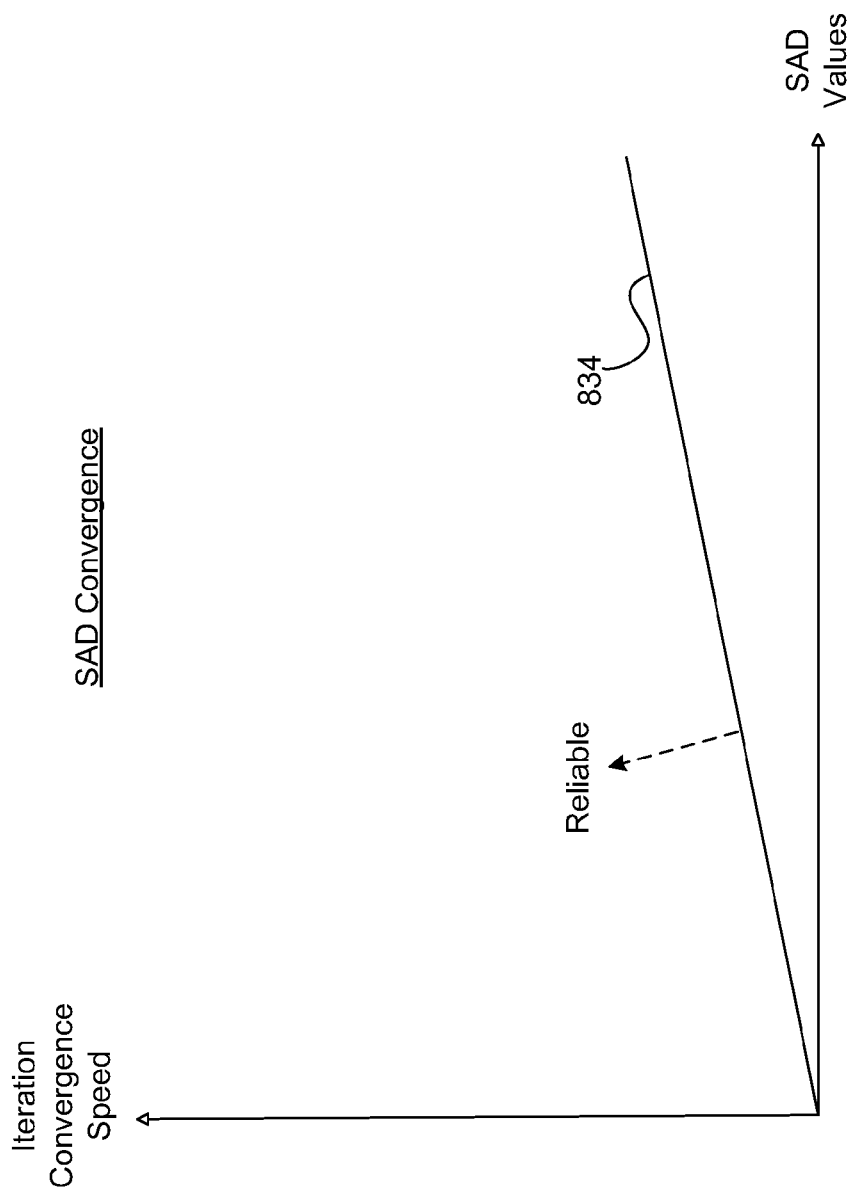
FIG. 8C is a graph illustrating a SAD convergence technique, in accordance with one embodiment of the present invention.

Referring now to FIG. 8C, a graph illustrating a Sum of Absolute Differences (SAD) convergence technique is shown, in accordance with one embodiment of the present invention. The FIG. 8C embodiment is presented for purposes of illustration, and in alternate embodiments, the present invention may perform SAD convergence techniques with configurations and parameters in addition to, or instead of, certain of those configurations and parameters discussed in conjunction with the FIG. 8C embodiment.

The FIG. 8C graph relates to statistical information derived from the depth estimation procedure using blur images that is discussed above in conjunction with FIGS. 5B-5C. In the FIG. 8C graph, SAD values for pairs of defocused blur images are shown on a horizontal axis, and iteration convergence speeds for a depth estimation procedure (see FIGS. 5B-5C) are shown on a vertical axis. The FIG. 8C graph further includes a classifier curve 834 that may be derived in any effective manner to indicate which depth values are reliable and which are unreliable. In certain embodiments, the classifier curve 834 may be derived in accordance with the following formulas.

$$\text{Iter\_Convergence} = \frac{(SAD_{initial} - SAD_{final})}{\text{iteration}_{normalized}}$$

$$\text{iteration}_{normalized} = \frac{\text{iteration}_{current}}{\text{iteration}_{bound}}$$

$$\text{SAD\_conv\_slope} = \frac{\text{Iter\_Convergence}}{SAD_{initial}}.$$

In certain embodiments, classifier 834 may be generated based upon empirical statistics of observed depth value data. In the FIG. 8C embodiment, depth values that lie above classifier 834 may be deemed reliable, while depth values that lie below classifier 834 may be deemed unreliable.

Referring now to FIG. 9, a diagram for one embodiment of a simplified confidence map 922 is shown, in accordance with the present invention. The FIG. 9 confidence map 922 is presented for purposes of illustration, and in alternate embodiments, confidence maps may include various other components and configurations in addition to, or instead of, those components and configurations discussed in conjunction with the FIG. 9 embodiment. For example, for purposes of simplicity, the FIG. 9 confidence map 922 is shown with only four confidence values. These four confidence values of the FIG. 9 confidence map 922 may correspond to the four depth values of the foregoing FIG. 5A depth map 522. However, confidence maps with any number of confidence values are equally contemplated in the present invention.

In the FIG. 9 embodiment, confidence map 922 may be generated in any effective manner. For example, confidence map 922 may be generated during step 774 of FIG. 7C, as discussed above. In the FIG. 9 example, confidence map 922 includes a confidence value A 926(a), a confidence value B 926(b), a confidence value C 926(c), and a confidence value D 926(d). In certain embodiments, confidence map 922 may be provided to various noise reduction modules that may choose to treat depth values with confidence values below a predetermined threshold as noise.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for generating a robust depth map, comprising:
    a memory that includes:
        a depth map structure that includes a plurality of depth map levels that each have different resolution characteristics, wherein
        said plurality of depth map levels include a fine-scale depth map, a medium-scale depth map and a coarse-scale depth map; and
        a depth estimator that evaluates depth values from said plurality of depth map levels to identify optimal depth values for populating an optimized depth map, wherein
        said depth estimator generates said fine-scale depth map by applying a first compression ratio to an initial image data; and
    a processor that executes instructions stored in said memory.

2. The system of claim 1 wherein said depth estimator evaluates said depth values from said fine-scale depth map by utilizing fine-scale confidence features.

3. The system of claim 2, wherein said fine-scale confidence features include camera model/lens position features and implementation features,
    said camera model/lens position features including optical characteristics, lens positions, zoom positions, and camera calibration parameters, and
    said implementation features including a block size and a matching kernel type.

4. The system of claim 3, wherein said depth estimator evaluates said depth values from said medium-scale depth map and said coarse-scale depth map by utilizing said camera model/lens position features, said implementation features, and coarse-scale confidence features.

5. The system of claim 4, wherein said coarse-scale confidence features include statistic features and measurements features,
    said measurements features including motion vector measurements and pixel intensity measurements, and
    said statistics features including optimization rate statistics and a Sum-of-Absolute-Differences convergence technique.

6. The system of claim 5, wherein said Sum-of-Absolute-Differences convergence technique utilizes a classifier curve to indicate which of said depth values are reliable and which are unreliable, said classifier curve being generated based upon empirical statistics of observed depth value data.

7. The system of claim 1, wherein said first compression ratio is 1/4, said fine-scale depth map having a configuration of 4×4 blocks.

8. The system of claim 1, wherein said depth estimator evaluates said fine-scale depth map with selected fine-scale confidence features.

9. The system of claim 8, wherein said depth estimator categorizes depth values from said fine-scale depth map as one of: low-confidence depth values, medium-confidence depth values, and high-confidence depth values.

10. The system of claim 1, wherein said depth estimator generates said medium-scale depth map by applying a second compression ratio to said initial image data, said depth estimator also generating said coarse-scale depth map by applying a third compression ratio to said initial image data.

11. The system of claim 10, wherein said second compression ratio is 1/8, said medium-scale depth map having a configuration of 2×2 blocks,
said third compression ratio being 1/16, said coarse-scale depth map having a configuration of a single block.

12. The system of claim 10, wherein said depth estimator evaluates said medium-scale depth map and said coarse-scale depth map with selected coarse-scale confidence features to determine any reliable depth value candidates.

13. The system of claim 12, wherein said depth estimator performs a spatial resizing procedure to match block sizes of said coarse-scale depth map and said medium-scale depth map to block size of said fine-scale depth map.

14. The system of claim 13, wherein said depth estimator performs a magnitude scaling procedure to match depth value ranges of said coarse-scale depth map and said medium-scale depth map to depth value range of said fine-scale depth map.

15. The system of claim 14, wherein said depth estimator performs an update procedure to update said optimal depth values with said reliable depth value candidates by utilizing one of a selection technique and an averaging technique.

16. The system of claim 15, wherein said depth estimator performs a fusing procedure to create said optimized depth map from said optimal depth values of said fine-scale depth map, said medium-scale depth map, and said coarse-scale depth map.

17. The system of claim 16, wherein said depth estimator generates a final confidence map corresponding to said optimized depth map.

18. A method for generating a robust depth map, the method comprising:
in a device comprising a processor:
creating a depth map structure that includes a plurality of depth map levels that each have different resolution characteristics, wherein
said plurality of depth map levels include a fine-scale depth map, a medium-scale depth map and a coarse-scale depth map; and
utilizing a depth estimator to evaluate depth values from said plurality of depth map levels for identifying optimal depth values for populating an optimized depth map, wherein
said depth estimator generates said fine-scale depth map by applying a first compression ratio to initial image data.

19. A system for generating a robust depth map, comprising:
a memory that includes:
a depth map structure that includes a plurality of depth map levels each having different resolution characteristics, wherein
said plurality of depth map levels include a fine-scale depth map, a medium-scale depth map and a coarse-scale depth map; and
a depth estimator that evaluates depth values from said plurality of depth map levels to identify optimal depth values for populating an optimized depth map, wherein
said depth estimator evaluates said depth values from said medium-scale depth map and said coarse-scale depth map by utilizing camera model/lens position features, implementation features, and coarse-scale confidence features, wherein
said coarse-scale confidence features include statistic features and measurements features, wherein
said measurements features includes motion vector measurements and pixel intensity measurements, and
said statistics features includes optimization rate statistics and a Sum-of-Absolute-Differences convergence technique, and
a processor that executes instructions stored in said memory.

20. The system of claim 19, wherein said Sum-of-Absolute-Differences convergence technique utilizes a classifier curve to indicate which of said depth values are reliable and which are unreliable, wherein said classifier curve being generated based upon empirical statistics of observed depth value data.

* * * * *